United States Patent
Peled

(10) Patent No.: US 7,139,273 B2
(45) Date of Patent: Nov. 21, 2006

(54) SYSTEM AND METHOD FOR SYNCHRONIZING BETWEEN COMMUNICATION TERMINALS OF ASYNCHRONOUS PACKETS NETWORKS

(75) Inventor: Eran Peled, Kiryat Uno (IL)

(73) Assignee: TeraSync Ltd., Yehud, IL (US)

( * ) Notice: Subject to any disclaimer, the term of this patent is extended or adjusted under 35 U.S.C. 154(b) by 914 days.

(21) Appl. No.: 10/055,303

(22) Filed: Jan. 23, 2002

(65) Prior Publication Data

US 2004/0213238 A1  Oct. 28, 2004

(51) Int. Cl.
  *H04L 12/28* (2006.01)
(52) U.S. Cl. .................................. 370/394; 370/503
(58) Field of Classification Search ................ 370/394, 370/395.62, 503
See application file for complete search history.

(56) References Cited

U.S. PATENT DOCUMENTS

| | | | |
|---|---|---|---|
| 5,398,263 A * | 3/1995 | Vanderspool et al. | 375/376 |
| 6,246,738 B1 * | 6/2001 | Acimovic et al. | 375/240.03 |
| 6,943,609 B1 * | 9/2005 | Zampetti et al. | 327/292 |
| 2003/0026277 A1 * | 2/2003 | Pate et al. | 370/412 |
| 2003/0108799 A1 | 6/2003 | Khan et al. | 709/201 |
| 2003/0112758 A1 * | 6/2003 | Pang et al. | 370/235 |

* cited by examiner

Primary Examiner—Chi Pham
Assistant Examiner—Christopher Grey
(74) Attorney, Agent, or Firm—Fleit Kain Gibbons Gutman Bongini Bianco; Martin Fleit; Paul D. Bianco

(57) ABSTRACT

The present invention provides a method for synchronizing the transmission of real time synchronous data packets over asynchronous optical networks between at least two user terminal nodes. This methodology proposes to use a receiver and transmitter module implemented within intermediating communication devices that are connected between the TDM equipment and the asynchronous optical network. According to this method, sequence numbers are encapsulated within the data packets payload at the transmitter terminal node, and a Stratum 3 classified clock pulse is provided to the transmitter terminal node. At the receiver module the incoming data packets sequence number order is identified. In the case of detecting offsets of non-sequenced data packets, the clock rate of the receiving note is compensated. Finally the frequency rate of the incoming data signal is divided and the data transmission signal amplitude is attenuated for reducing jitter and wander in compliance with stratum 3 accuracy standards.

14 Claims, 7 Drawing Sheets

The IPsync Environment

SYSTEM AND METHOD FOR SYNCHRONIZING BETWEEN COMMUNICATION TERMINALS OF ASYNCHRONOUS PACKETS NETWORKS

BACKGROUND OF THE INVENTION

1. The Scope of the Invention

This invention relates to the synchronization of real-time data streams over asynchronous packet networks, and in particular to the synchronization of timing and data over Ethernet and IP optical networks.

2. Background

Industry experts recognize that Internet growth has created an unprecedented demand for additional core network capacity. The scalable and distributed nature of the Internet continues to contribute to it's growth on all of the fronts, including users, hosts, links and existing and emerging applications.

Internet users have been connecting at higher link speeds, and usage duration continues to grow, creating an exponential increase in traffic volumes.

Today's Metropolitan Area Networks (MAN) are based on SONET optical rings. The SONET protocol, originally designed for carrying voice, can no longer accommodate the requirements of a world that is becoming data-centric. The most suitable transport paradigm for the new packet-based traffic, increasing at a furious pace, is the Ethernet.

Though computing network environments have evolved and transmission rates have increased exponentially, the Ethernet network architecture has remained dominant. While a communication rate of 10 Mb/s was once considered as state-of-the-art technology, today an Ethernet local Area Network (LAN) may transmit at speeds of up to 10 Gbps, 20 Gbps and even more.

This is due to the development of optical fiber technologies that have enabled the transmission of digital data streams at rate of up to 10 gigabit/sec and more. This channel-to-channel technology involves the coupling of various computer systems together with optical fiber or with a fiber channel compatible electrically conductive (copper) cable, allowing data transmissions between machines separated by relatively great distances.

The existing switches and routers provide neither the performance nor the port density required to efficiently create a real-time simultaneous network with raw optical data.

One of the main characteristics of TERM (Time Division Multiplexing) networks is time synchronization, (a natural requirement of it's time slots multiplexing method). In the Public Switched Telephone Network (PSTN) or in SONET/SDH networks, a clock master provides a primary time reference for synchronizing all of the network nodes (the time discipline). This master clock has an extremely long term accuracy of one part in $10^{-11}$. This reference time, the accuracy of which is called stratum 1, provides the reference clock to secondary network nodes with stratum 2 accuracy, and these in turn provide a time reference to stratum 3 E and then stratum 3 nodes. This hierarchy of time synchronization is essential for the proper functioning of the TDM network as a whole.

A 10 gigabit optical network lacks the ability of transferring real-time synchronous data, since it is all based on a best effort from each of the routers within the Ethernet cloud and since the nature of pure packetized networks that cannot ensure a stable or expected delay. This current situation does not allow good quality telephone voice transmissions to be created.

One of the main drawbacks that prevent optical networks from providing real-time data transmissions is the lack of synchronization between clock frequencies of both, the receiving and transmitting terminals, which are connected to the optical network. In TDM applications, the transmitter and the receiver must share a common time base or at least be synchronized with one another in a Master/Slave chain, otherwise there cannot be a TDM connection.

This drawback results from several factors. The data Packets transmission in an asynchronous network suffers from random delays that are known as jitter and wander. The term "jitter" is used to describe short term signal variations, such as pulse position modulation frequencies that exceed frequencies of 10 Hz, The term "wander is used to describe longer term variations of significant digital signal properties (e.g., zero level crossings) from their ideal positions in time and is applied to pulse position modulation frequencies below 10 Hz.

Jitter is typically attributed to additive Gaussian noise, whereas wander is typically attributed to slower varying environmental conditions.

Prior art methods and systems overcome the mentioned deficiencies by using a methodology called phase locked loop (PLL) (e.g. U.S. Pat. No. 6,246,738).

Another approach to overcoming this randomness when emulating TDM over an IP network is by using a buffer (FIFO) to smooth out all of the incoming data. This approach assumes that the proper time references are available. For the most part, however, the original time reference information is no longer available. The average time of emptying the buffer must be the same as the average rate of filling it up, otherwise we would be loosing data.

Another factor is known as packets slipping or the loss of data packets. This problem is more acute When relating to high rate data transfer networks such as an optical 10 gigabits network. Data packets arriving out of order result in substantial differences between the clock frequencies of the receiving device and transmitting device In this case, trying to restore a clock frequency according to the incoming packet rate, using it as a reference for the original transmission (+Jitter and −Wander caused by the network), the restored frequency is inaccurate, a result of the lost packets. Even the loss of only one packet out of a million packets creates a frequency error of 1 PPM ($1\times10^{-6}$), while the bit rate synchronization must satisfy $1\times10^{-12}$ accuracy standards.

Prior art solutions, as proposed in U.S. Pat. No. 5,790,538, mainly address the problems of the actual loss of the data packets and methods for recovering them.

It was then suggested to provide time standards such as atomic clocks or GPS receivers to each edge terminal, thus relieving the IP network from the need to send and receive synchronization information. This suggestion does not provide any solution at all and would be a costly attempt. The incoming data has a certain momentary clock rate (according to the actual wander) that is dependent on routing interference, temperature effects, network delays etc. If we try to extract that data by using an external clock (such as a GPS clock) even as accurate as an atomic standard, when the data is coming in a different average frequency the slips and inaccuracy problems and loss of data remain the same, The local clock should represent the changing average of the incoming data at the time. This type of clock is called a "Breathing Networking Clock" that is capable of managing with the flexibility of the network (yet having a time discipline set to one central location, usually to the core switch that has the most accurate clock, and this accurate clock is also looked onto a better clock upstream.)

There is also another solution based on retrieving the clock data from the nearest PSTN using existing linkages to the PBX via SONET. Such a solution requires the use of two competing networks and is based on the assumption that the PSTN is the same on both sides of the network. This is a very dangerous assumption, especially in a wide IP network. Even if this assumption fulfills itself, the cost is still substantially high since the customer would have to pay for the use of two (and some times even four) different suppliers and networks.

Therefore, it is the primary object of this invention to avoid the limitations of the prior art and provide a real-time synchronous data transmission over asynchronous networks of at least 1 gigabit and faster (up to 10 GB/S)

SUMMARY OF THE INVENTION

The present invention provides a method for synchronizing the transmission of real time synchronous data packets over asynchronous optical networks between at least two user terminal nodes. This methodology proposes to use a receiver and transmitter module implemented within intermediating communication devices that are connected between the TDM equipment and the asynchronous optical network. This method is comprised of the following steps: encapsulating data packets to include a sequence number in the data packet payload at the transmitter terminal node, providing the (TDM switch of) transmitter terminal node with Stratum 3, Stratum 3 E, SMC or SEC classified clock pulse; preparing encapsulated data packets for transmission by the transmitter device according to the stratum 3 (3 E) clock pulse, transmitting prepared data packets through an asynchronous network; receiving incoming data packets from an asynchronous network at the receiver terminal nodes; detecting the sequence Amber order of the received data packets at the receiver terminal node; compensating the packet rate of received data packets in the case of detecting offsets of non sequenced data packets; dividing the frequency rate of the incoming data signal; and attenuating the data transmission signal amplitude for reducing jitter and wander in compliance with stratum 3 accuracy standards;

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein.

DETAILED DESCRIPTION OF THE PREFERRED EMBODIMENTS

The present invention provides a new methodology followed by equipment for enabling real-time synchronous data transmission in asynchronous metropolitan networks. Today, Metropolitan Area Networks (MAN) enable the transmission of asynchronous data packets between any two terminals connected to the network, The data packets transmission Is unorganized. Data packets arriving at the receiver terminal are not necessarily in the same order transmitted in. Furthermore, these packets may be subjected to time delays, which are random in length, herein referred to as "jitter". Random time delays are necessarily inherent in networks that transmit data in data subsets. Each data packet may arrive at the receiver with a total transmission time which may vary from packet to packet. Depending upon the network path and network congestion conditions, transmission time delays may be highly different between packets.

The main concept of the present invention is to provide a new communication module integrated within the intermediating device that is connected to the asynchronous networks edge nodes. These edge nodes are CTE equipment (Connected telecommunication equipment) or known by their nickname as "Pizza Boxes". This equipment is designated for intermediating between the asynchronous network and the TDM communication equipment and for ensuring organized data packet transmission and eliminating the networks interferences and affects of (changing) delays distortion.

Figure 1:
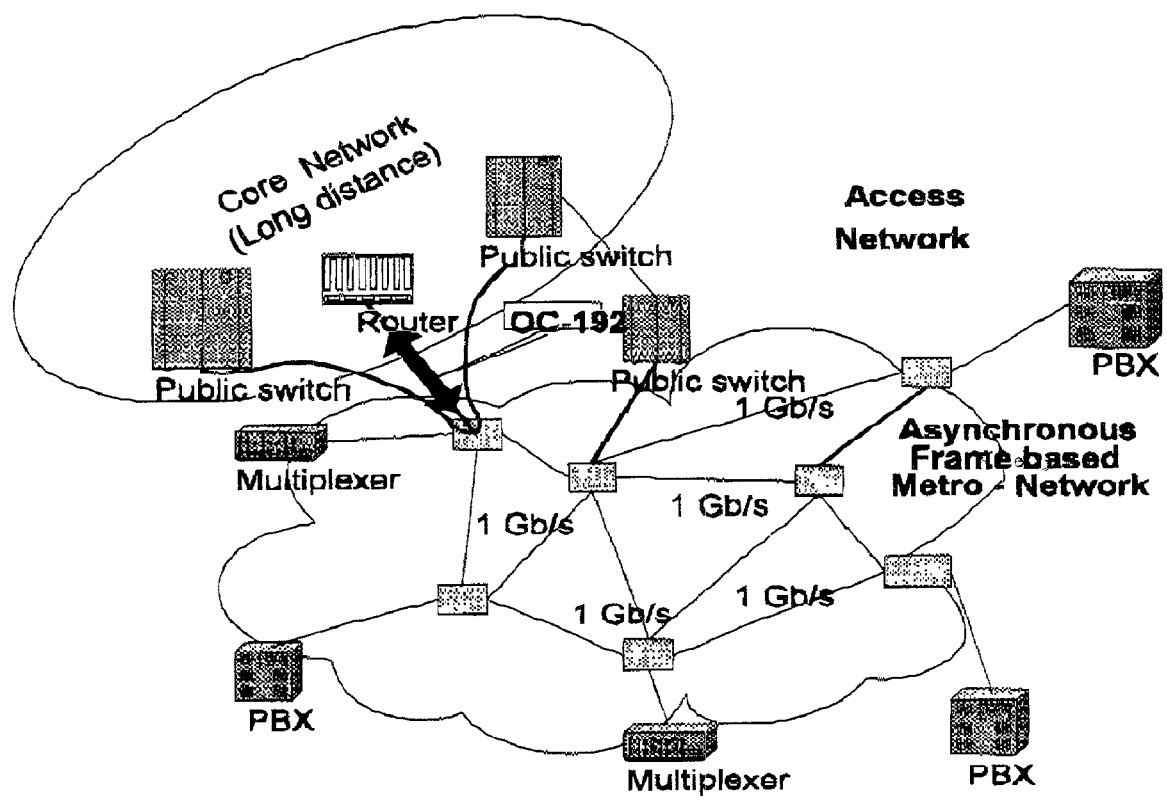
FIG. 1 is a representation of the of prior art network environment.

FIG. 1 illustrates the environment according to prior art in which the present invention will be practiced. The metro-network connects between the local PBX devices and long distance core networks through optical wiring that enables data transmissions at a rate of 10 gigabit Gbps and more.

Figure 2:
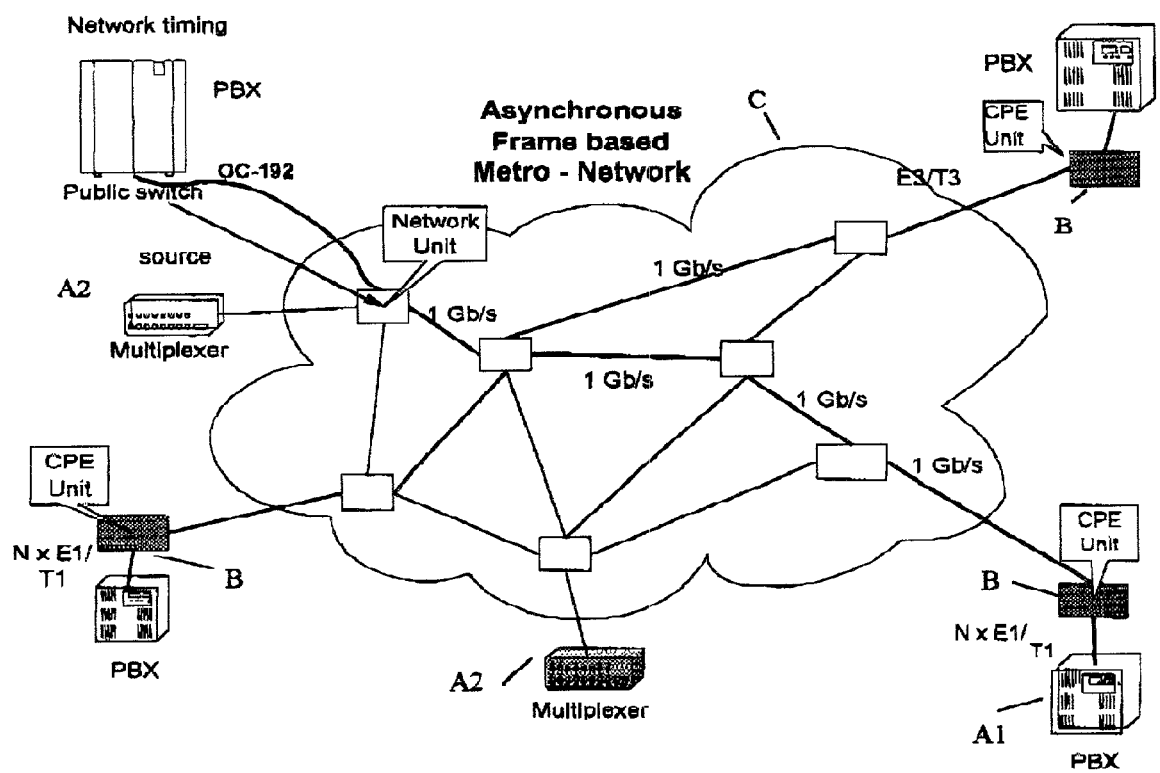
FIG. 2 is an illustration of environment in which the present is practiced.

FIG. 2 depicts an example of applying the present invention system and method in a telecommunications network, Edge network nodes such as a PBX (private branch exchange) A1, multiplexer A2 or Internet servers A3 are interconnected through a metropolitan asynchronous network C. The CTE devices B are intermediating devices that enable the synchronous data transmissions between the network edge nodes. (A1,A2,A3).

Figure 3:
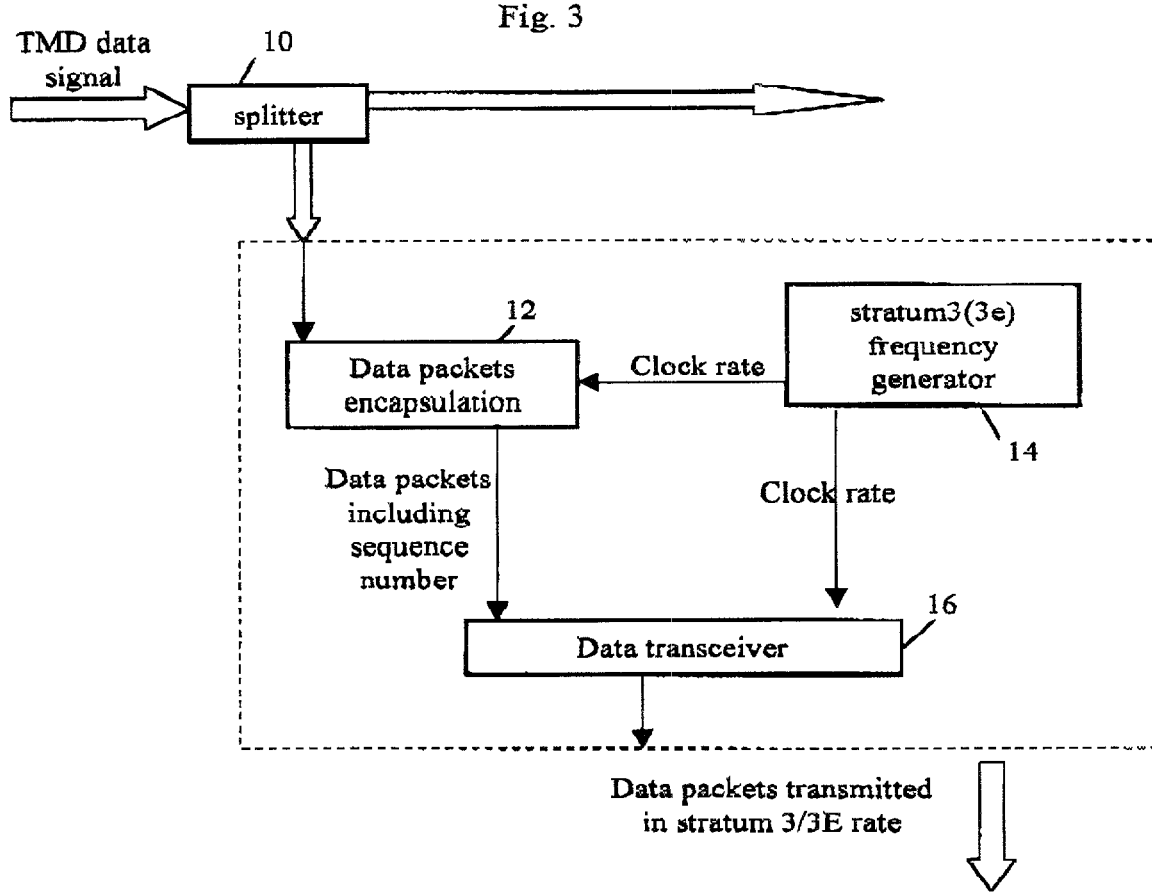
FIG. 3 is a block diagram illustrating the transmitter synchronizing module according to the present invention.

FIG. 3 illustrates the block diagram of the transmitting module which is implemented within the intermediating device B. Splitter unit 10 is associated with the device input interface for routing the input of the TDM data signal through the device B without interfering with the stream of dataflow in the network. The data packets encapsulation "unit 12" processes each of the arriving data packets, generates sequence numbers and adds them to the data packet payload (Alternatively the sequence number may be inserted in the headers of the data packets). Stratum 3 frequency generator 14 feeds the units 12 and 16 with an accurate clock rate for synchronizing the encapsulated data packets transmission according to Stratum 3 standards. The data transceiver 16 unit receives the processed data packets and prepares them for transmission to the metropolitan network C.

Figure 4:
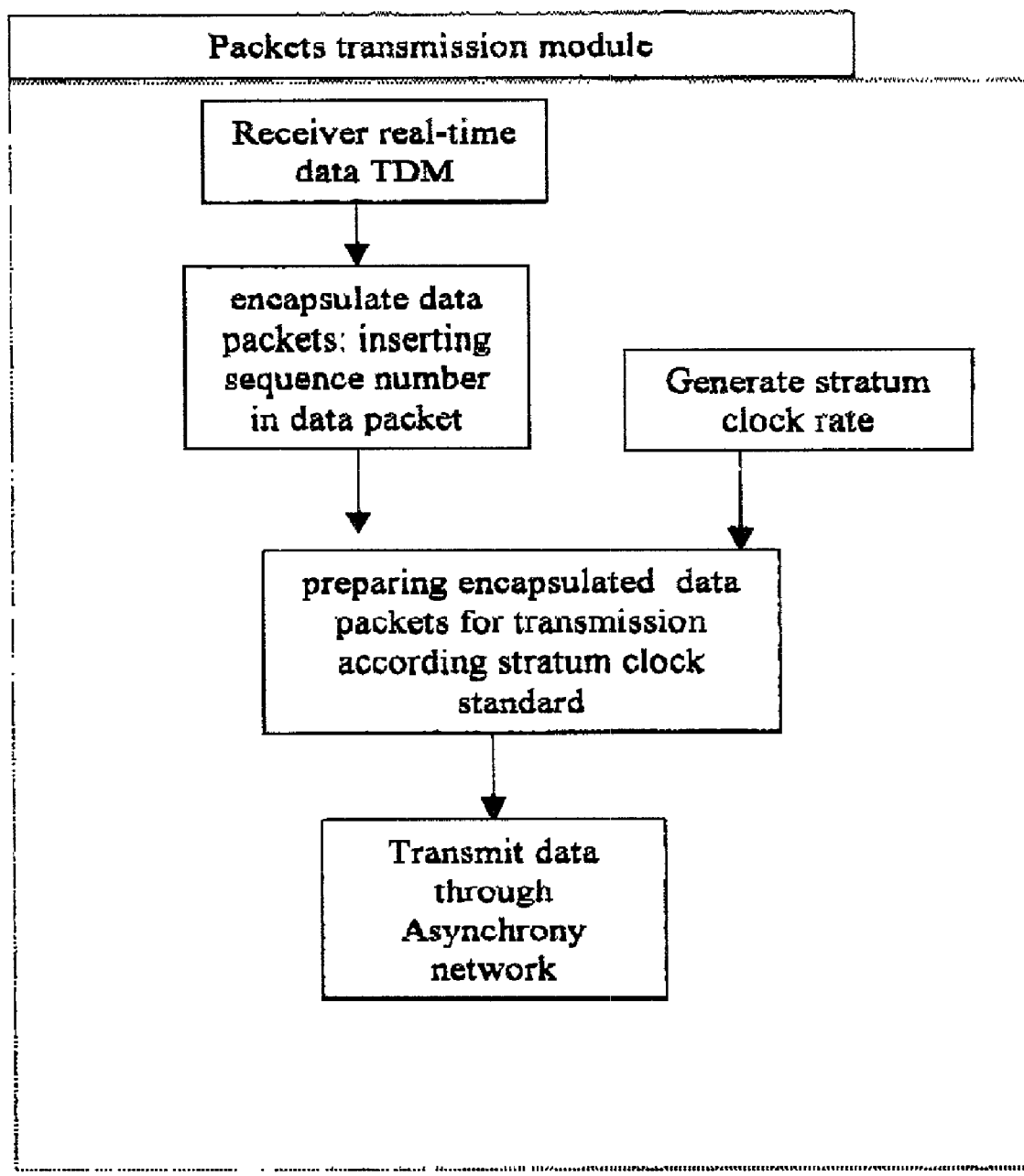
FIG. 4 is a flowchart illustrating the process of recovering clocks frequency according to data packets sequence.

The flow of data signal processing and transmission is illustrated in FIG. 4. For each of the arriving real-time TDM signal data packets, a new sequence number is generated to indicate the order of the transmission. The generated number is inserted into either the data packet's payload or data packet's header. This encapsulating operation has no interference with the data packets definition as it utilizes spare date bits from the data packets payload. Continuously, the frequency generator 14 creates clock pulses at a constant rate in compliance with the stratum 3 standards. The encapsulated data packets are prepared for transmission by arranging the arriving packets according to a pre-defined order and broadcasting thereof in compliance with stratum 3 pulse rates.

Figure 5:
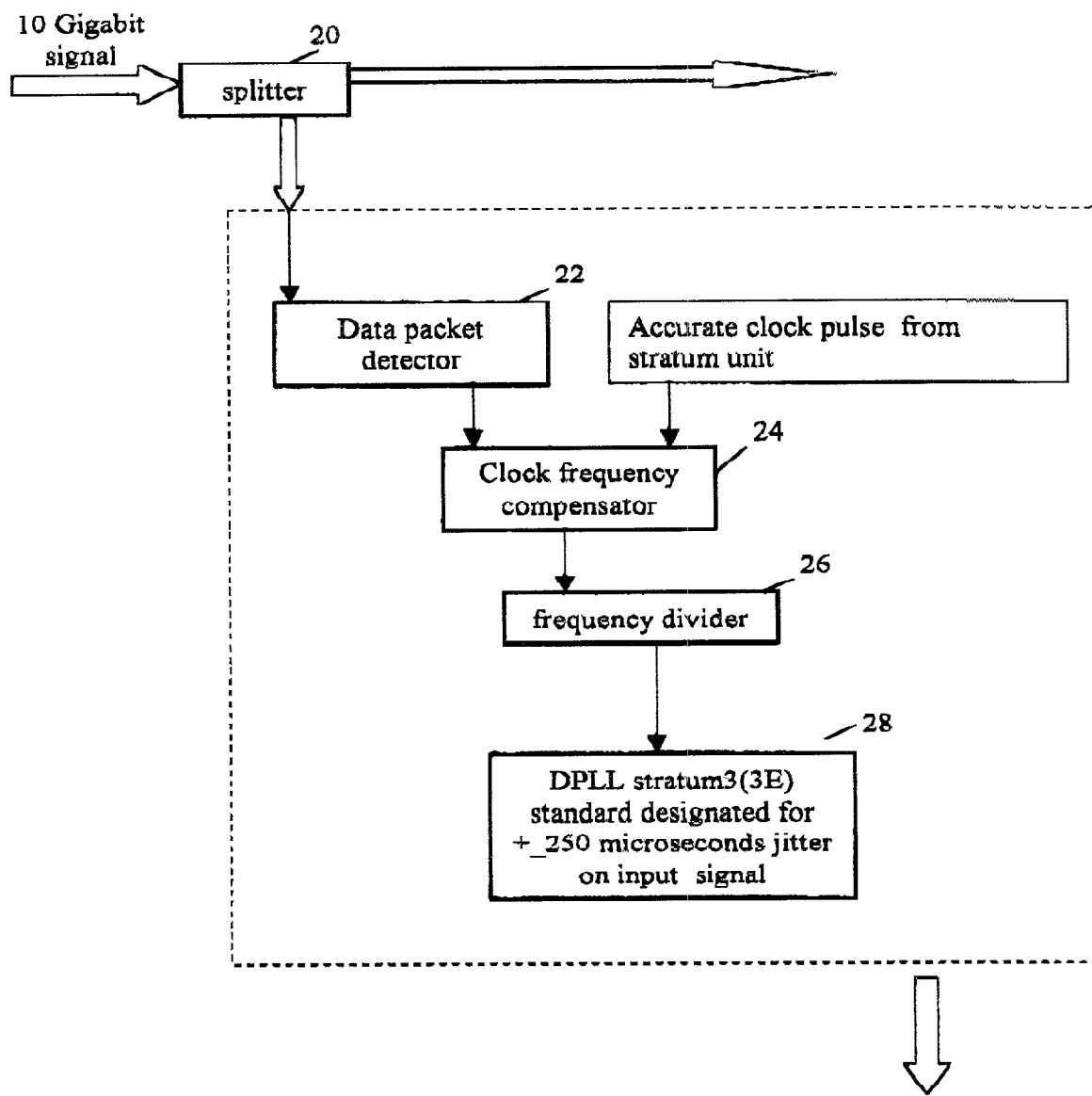
FIG. 5 is a block diagram illustrating the receiver/synchronizing module according to the present invention.

FIG. 5 depicts the receiver module implementation within device B. Splitter 30, which is associated with the input interface of the receiving section, routes the incoming data signals from network C to the device B receiver unit without interfering with the data flow directed to the edge nodes devices (A1, A2, or A3). The data packet detector component 22 checks each date packet payload for the purpose of restoring the encapsulated sequence number.

Figure 6:
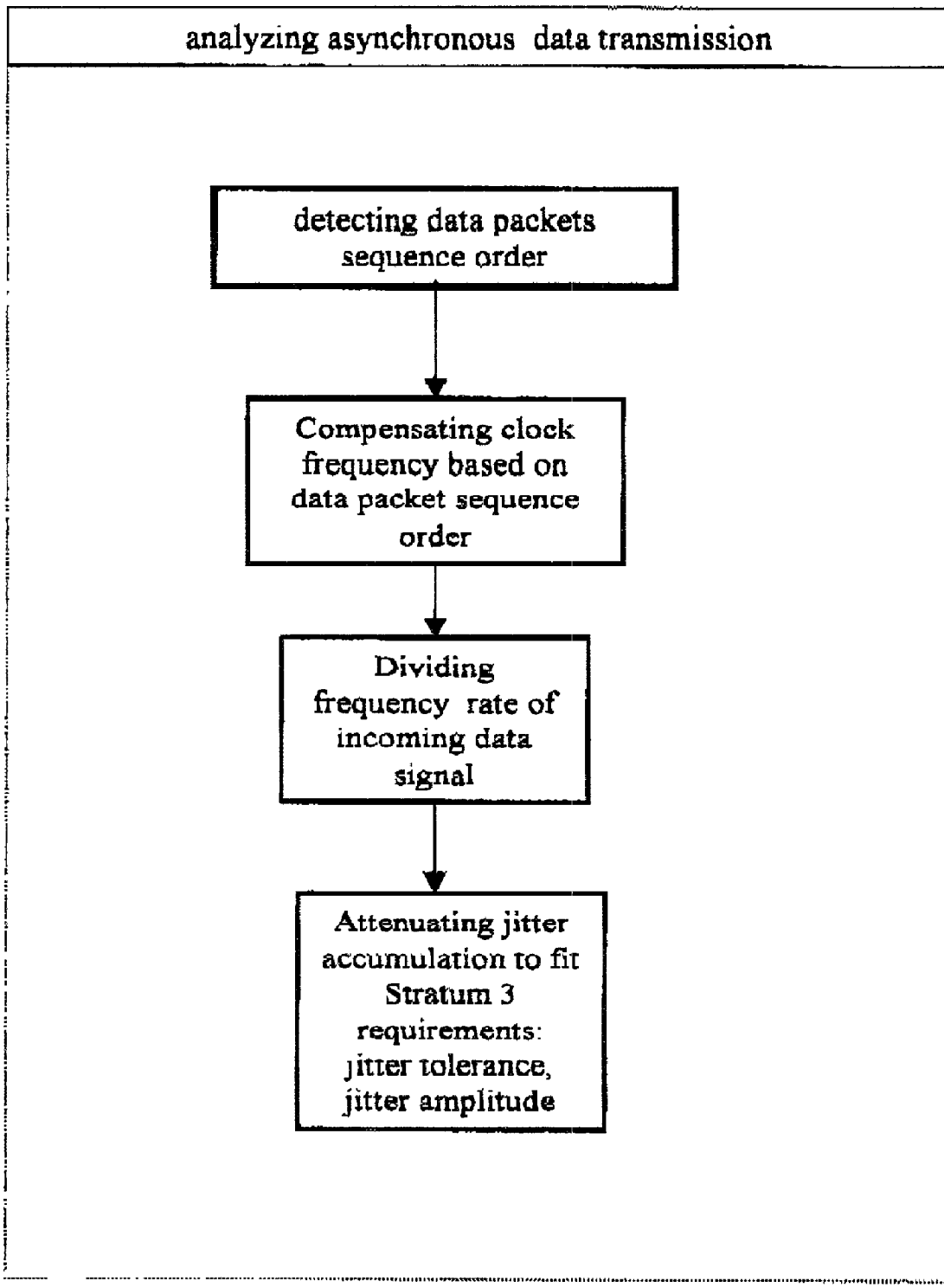
FIG. 6 is a flow-chart illustrating the process of organizing data packets for transmission according to the present invention.
Figure 7:
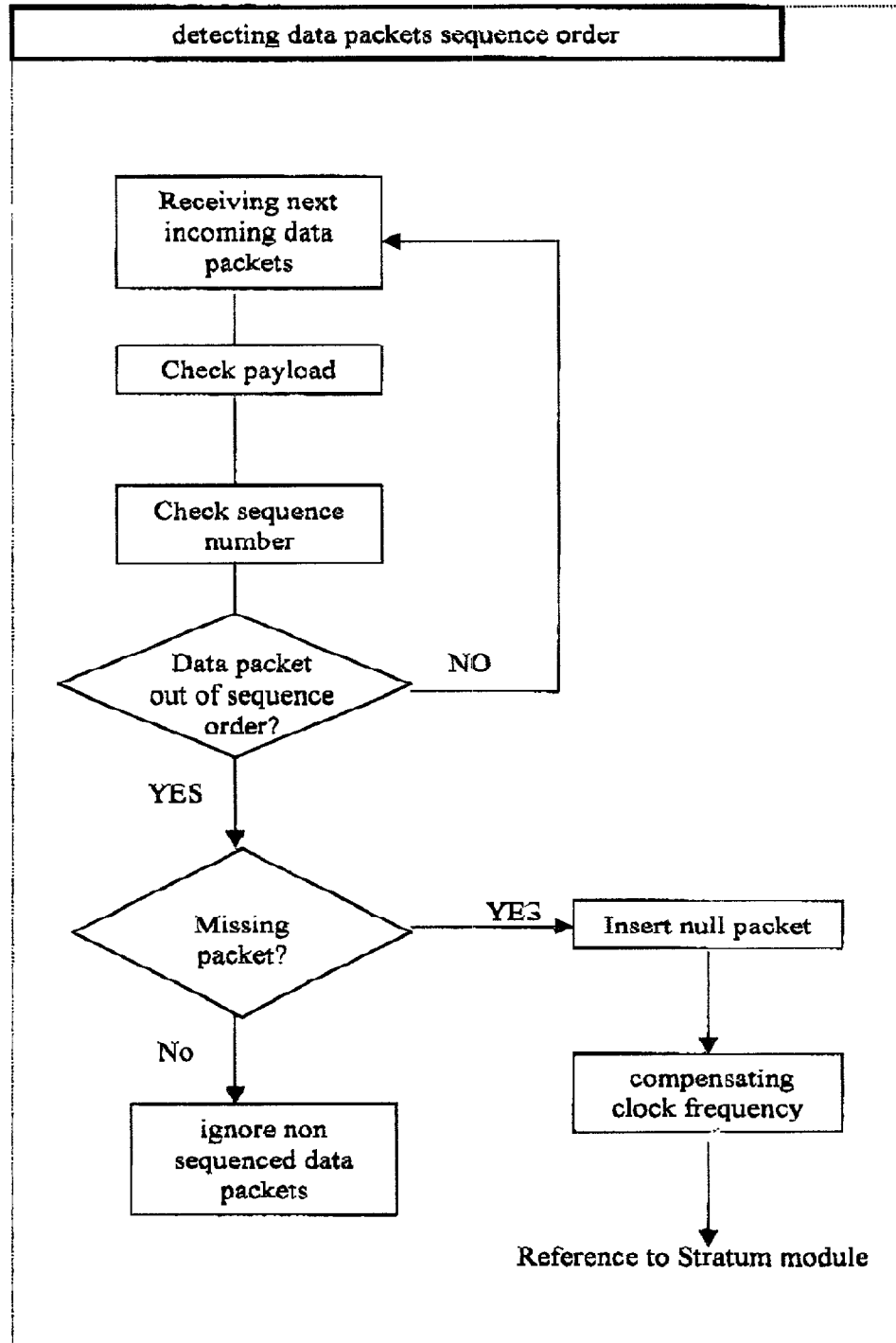
FIG. 7 is a flow chart describing the process of analyzing incoming date packets.

The flow chart for handling the sequence number is illustrated in FIG. 6. Each data packet is intended to arrive in a specific time frame (window) in accordance with it's sequence order, expected Jitter and some spares. Data packets arriving from out of the defined time frame are treated as a "packet out of order" or as a "lost packet". In the case of a lost packet, the clock frequency compensator inserts a null data packet into the data signal flow, thus enabling it to receive the clock frequency rate (equivalent to the transmitting frequency of the incoming packets). In the case that data packets arrived a time frame ahead of time, in accordance with their sequential number the packets would be ignored.

In the next stage of the signal processing, the recovered frequency rate of the signal is divided using the frequency divider 26. This dividing operation enlarges the signals wave length (up to the limits of the minimum frequency time) between two cycles of the signal, making it possible to identify jitter and wander interferences within one signal cycle (as all jitter can be attributed to the single cycle edge of the signal). The signal is then further processed by the DPLL unit for attenuating jitter accumulation to fit the network synchronization requirements which state that the maximum jitter per network node must not exceed a value of ±250 Microseconds (as long as MPLS has not yet been activated).

The DPLL is programmed to reduce jitter and wander interferences in compliance with the Stratum 3 accuracy standards.

The synchronization solution, as proposed by our invention, does not require any changes within the user's TDM communication equipment or within the metropolitan network components. The communication module is installed only in the CPE boxes at each edge node.

While the above description contains many specifications, they should not be construed as limitations within the scope of the invention, but rather as exemplifications of the preferred embodiments. Those that are skilled in the art could envision other possible variations. Accordingly, the scope of the invention should be determined not only by the embodiment illustrated but also by the appended claims and their legal equivalents.

What is claimed:

1. A method for synchronizing the transmission of real time synchronous data packets over asynchronous optical networks between at least two user terminal nodes, using a receiver and transmitter module implemented within intermediating communication devices that are connected between the TDM equipment and the asynchronous optical network, said method comprising the steps of:

A. Encapsulating date packets to include a sequence number in the data packet payload at the transmitter terminal node;
B. Providing the transmitter terminal node with Stratum 3, Stratum 3 E SMC or SEC classified clock pulse;
C. Preparing encapsulated data packets for transmission by the transmitter device according to the stratum 3 clock pulse;
D. transiting prepared data packets through an asynchronous network;
E. Receiving incoming data packets from an asynchronous network at the receiver terminal node;
F. Detecting the sequence number order of the received data packets at the receiver terminal node;
G. Compensating the packet rate of received data packets in the case of detecting offsets of non sequenced data packets enabling the receiver to receive the clock frequency rate that is equivalent to the transmitting frequency of the incoming packets;
H. Dividing the frequency rate of the incoming data signal; and
I. Attenuating the data transmission signal amplitude for reducing jitter and wander in compliance with stratum 3 accuracy standards.

2. The method according to claim 1 wherein the jitter and wander is reduced below the value of ±250 microseconds.

3. The method according to claim 1 wherein the compensation is achieved by inserting a null data packet in case of missing data packets and ignoring data packets in the case that their sequential number is out order.

4. The method according to claim 1 wherein the incoming data signal division enlarges the signal wavelength between two cycles of the signal.

5. A receiver/transmitter module implemented within intermediating communication devices that connect between TDM communication equipment and the asynchronous optical network for the synchronizing the transmission of real time synchronous data packets over asynchronous optical networks between at least two user terminals nodes, said module is comprised of:

A. Data packets encapsulator for inserting a sequence number in the data packet payload;
B. Stratum 3 clock rate generator for providing a classified clock pulse to the receiving terminal node;
C. Data transceiver unit for preparing encapsulated data packets for transmission according to the stratum 3 clock pulse standard by the transmitter node and transmitting thereof through the asynchronous network;
D. Receiver unit for receiving incoming data packets from the asynchronous network;
E. Data packet detector for identifying the sequence number of received data packets;
F. Clock frequency compensator for recovering the clock rate in the case that offsets of non sequenced data packets are detected enabling the receiver to receive the clock frequency rate that is equivalent to the transmitting frequency of the incoming packets;
G. Frequency divider for dividing the incoming data signal; and
H. Advanced DPLL unit for attenuating the jitter and wander amplitude that is combined with the incoming data transmission signal in order to provide output signals in compliance with stratum 3 standards.

6. The module according to claim 1 wherein the jitter and wander is reduced below the value of ±250 microseconds.

7. The module according to claim 1 wherein the compensation is achieved by inserting a null data packet in the case of missing data packets and ignoring data packets in case their sequential number is out of order.

8. The module according to claim 1 wherein the incoming data signal division enlarges the signal wave length between two cycles of the signal.

9. A system for enabling real-time synchronous data transmission in asynchronous metropolitan networks comprising:
- an asynchronous optical TDM network;
- a transmitting intermediating device and a receiving intermediating device connected with the asynchronous optical TDM network, wherein the intermediating device intermediates between the asynchronous network and the TDM communication equipment;
- a first communication module integrated within the transmitting intermediating device for preparing data packets and synchronizing the data packets wit Stratum 3 clock;
- a second communication module integrated within the receiving intermediating device for detecting data packet sequence order, compensating forte clock frequency of the data packets and attenuating jitter and wander accumulation according to Stratum 3E requirements; and
- a set of instructions for enabling real-lime synchronous data transmission over the asynchronous optical TDM network.

10. The system of claim 9, wherein the transmitting intermediating device first communication module further comprises;
- a splitter unit connected with the intermediary device input interface for routing the input of the TDM data signal through the intermediating device;
- an encapsulation unit to process each arriving data packet, generate a sequence number associated with the arriving data packet and adding the sequence number to one of the data packets payload and the headers of the data packets to generate an encapsulated data packet;
- a data transceiver for receiving the processed encapsulated data packets and preparing the encapsulated data packets for transmission; and
- a Stratum 3E frequency generator for generating an accurate clock signal used by the encapsulation unit and the transceiver for synchronizing the encapsulated data packet transmission with Stratum 3E clock.

11. The system of claim 9, wherein the set of instructions comprises:
- a first subset of instructions for receiving real-time TDM signal data packets;
- a second subset of instructions for generating a sequence number corresponding to the data packet and inserting the sequence number in the data packets; and
- a third set of instruction for arranging the received data packets according to a predefined order and broadcasting the arranged data packets in compliance with Stratum 3E clock.

12. The system of claim 9, wherein the receiving intermediating device second communication module further comprises:
- a data packet detector for detecting data packets sequence order;
- a clock frequency compensator for compensating clock frequency based on data packet sequence order;
- a frequency divider for dividing the frequency rate of incoming data signals; and
- a DPLL for attenuating jitter and wander accumulation according to Stratum 3E requirements.

13. The system of claim 9 wherein the Stratum 3E standard comprises: compliance with one of Stratum 3, SMC and SEC classified clock pulse.

14. A system for enabling real-time synchronous data transmission in asynchronous metropolitan networks comprising:
- an asynchronous optical TDM network;
- a transmitting intermediating device and a receiving intermediating device connected with the asynchronous optical TDM network, wherein the intermediating device intermediates between the asynchronous network and the TDM communication equipment;
- a first communication module integrated within the transmitting intermediating device for preparing data packets and synchronizing the data packets according to one of Stratum 3, Stratum 3E, SMC and SEC classified clock pulse standards, the first communication module comprising:
  - a splitter unit connected with the intermediary device input interface for muting the input of the TDM data signal through the intermediating device;
  - an encapsulation unit to process each arriving data packet, generate a sequence number associated with the arriving data packet and adding the sequence number to one of the data packets payload and the headers of the data packet payload to generate an encapsulated data packet;
  - a data transceiver for receiving the processed encapsulated data packets and preparing the encapsulated data packets for transmission; and
  - a Stratum 3 frequency generator for generating an accurate clock signal used by the encapsulation unit and the transceiver for synchronizing the encapsulated data packet transmission according to the Stratum 3 clock;
- a second communication module integrated within the receiving intermediating device for detecting data packet sequence order, compensating for the clock frequency of the data packets and attenuating jitter and wander accumulation according to Stratum 3 requirements, the second communication module comprising;
  - a data packet detector for detecting data packets sequence order;
  - a clock frequency compensator for compensating clock frequency based on data packet sequence order;
  - a frequency divider for dividing the frequency rate of incoming data signals; and
  - a DPLL for attenuating jitter and wander accumulation according to Stratum 3 requirements; and
- a set of instructions for enabling real-time synchronous data transmission over the asynchronous optical TDM network.

* * * * *